N. POWER.
METHOD FOR TREATING FILMS FOR MOTION PICTURE MACHINES.
APPLICATION FILED NOV. 20, 1912.
1,117,239.
Patented Nov. 17, 1914.
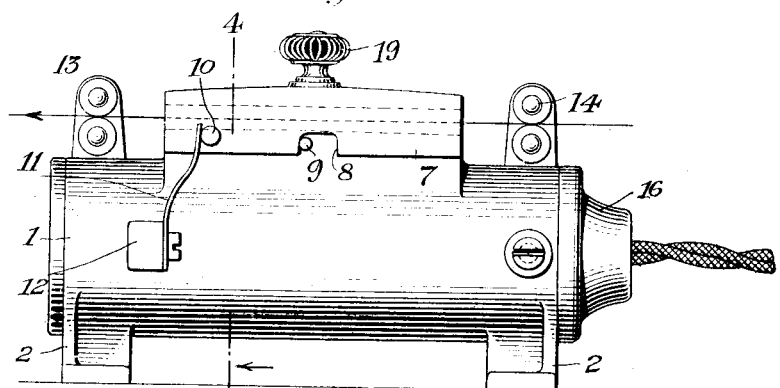
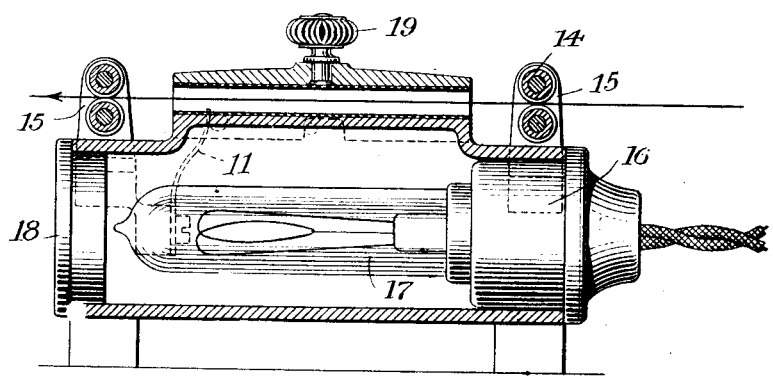
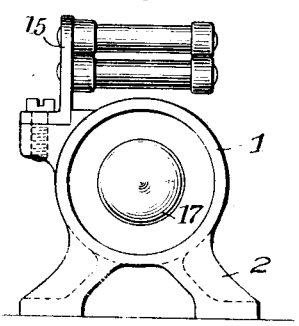
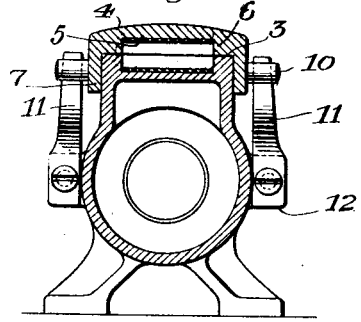
Witnesses:
Inventor
Nicholas Power
By his Attorneys

UNITED STATES PATENT OFFICE.

NICHOLAS POWER, OF BROOKLYN, NEW YORK.

METHOD FOR TREATING FILMS FOR MOTION-PICTURE MACHINES.

1,117,239. Specification of Letters Patent. Patented Nov. 17, 1914.

Application filed November 20, 1912. Serial No. 732,429.

*To all whom it may concern:*

Be it known that I, NICHOLAS POWER, a citizen of the United States, residing in Brooklyn, county of Kings, and State of New York, (whose post-office address is No. 388 Jefferson avenue,) have invented new and useful Improvements in Methods for Treating Films for Motion-Picture Machines, of which the following is a specification.

This invention relates to the method and apparatus for heat-treating films for motion picture projecting machines, and has for its object to provide a method of treating such films which will prevent the films sticking to the guide members of the machine adjacent the projection aperture, or other portions of the machine, during the projection of the picture and thereby damaging the film as well as interfering with the exhibition.

A further object of my invention is to provide an apparatus for carrying the above mentioned method into effect, which apparatus is of a simple and inexpensive construction, not liable to get out of order, and which may be readily operated to effectively treat a considerable length of film in a comparatively short length of time.

In motion picture projecting machines as at present constructed the reel of film is supported in a magazine at the top of the machine and is thence fed downward by intermittently operating sprocket wheels engaging the perforations in the margins of a film, past the projection aperture of the machine. To maintain the film in proper position relative to the aperture during its movement past the same it is guided between two pairs of guides which engage the margins of the film, the guides of each pair being pressed together by a suitable spring construction to exert a sufficient pressure on the film to hold it stationary in proper position relative to the projection aperture in the intervals between the intermittent movement of the feed stroke. The metal forming the guides is right in line with the rays of light from the arc lamp or calcium light of the projecting lantern and soon becomes heated to a temperature considerably above the rest of the machine. It has been found in practice that these hot guides bearing upon the margin of the film tend to melt certain fusible matter on the film, particularly the cement between the joined ends of the different portions of the film comprising the entire reel. The cement and other matter melted off the film collects on the guides to such an extent that it frequently causes the film to adhere to the guides during the moment that it is stationary so that on the next intermittent movement of the feed sprockets the teeth of the sprockets not infrequently tear off portions of the margins of the film, in some instances tearing the film completely in two. I have found that this defect can be obviated by treating the films in the manner hereinafter described, and with the aid of the apparatus shown in the accompanying drawings and forming part of my invention.

In the said drawings Figure 1 is a side elevation of my improved apparatus; Fig. 2 is a longitudinal section on the median line thereof; Fig. 3 is an end view looking from the left of Fig. 1 with the end plug removed, and Fig. 4 is a cross section on the line 4—4 of Fig. 1.

In describing my invention I will first describe my improved apparatus and then describe the manner in which it is manipulated in carrying my improved method into effect.

Referring now to the drawings, 1 designates a tubular housing provided with legs 2, by which it may be supported on a suitable table or attached to a wall or other surface as may be convenient. Formed integral with the upper surface of the housing are two guides 3 having their outer edges spaced apart a distance equal to the width of the film to be treated, and themselves of a width equal to the aforementioned guides of an ordinary motion picture projecting machine.

The portion of the housing connecting the guides 3 is depressed an appreciable distance below the surface of the guides 3, and is preferably covered with asbestos or some other heat insulating material, as shown in Fig. 4 to protect the portion of the film carrying the picture from the action of the heat radiating from the housing 1, as will be presently described. Coöperating with the guides 3 is a shoe 4 comprising an intermediate web 5 preferably covered with asbestos, and guides 6 on each side of the intermediate web corresponding with the guides 3 adapted to engage the margins of the film opposite the guides 3 said shoe being provided with a handle 19 on its upper surface. Beyond the guide 6 the shoe 4 is provided with suitable flanges 7 which engage the outer vertical faces of the guides 3 to hold the shoe in place.

The flanges 7 are notched in the middle as shown at 8 in Fig. 1 to engage pins 9 projecting from the sides of the guides 3. Pins 10 project from the sides of the flanges 7 adjacent one end, and these pins are engaged by suitable springs 11 attached to ears 12 projecting from the housing 1. The notches 8 are considerably wider than the diameter of the pins 9 and the springs 11 act to hold the edges of the notches in engagement with the pins. At each end of the housing 1 suitable guide rollers 13, 14 are mounted in pairs with their engaging surfaces in line with the meeting faces of the guides 3 and 6, the rollers 13, 14 being supported at one end only on suitable brackets 15 attached to the housing 1 so that the films may be slipped between the rollers from the side.

The housing 1 is substantially cylindrical at each end and fitting one end of the same is a socket plug 16 for an incandescent electric globe 17 for heating the housing, the opposite end of the housing being closed by a suitable plug 18 to prevent the escape of the air heated by the globe 17 so that the heat of the lamps can only be diffused by radiation through the walls of the housing.

In operation the device is assembled in the manner described, and the film to be treated is threaded through the feed rollers 13, 14 and between the guides 3 and 6, the shoe 4 being lifted off by its handle 19 to facilitate placing the film in position. The light is now turned on and after the housing has become sufficiently heated the film is fed toward the left in the direction of the arrow shown in Fig. 1 by a suitable feed mechanism, not shown, for instance, the rewinding device commonly employed in moving picture mechanism to rewind the film after it has been exhibited in the machine.

The size of the lamp 17 is so proportioned relative to the radiating surface of the housing 1 that the guides 3 and 6 become heated to a degree well above that to which the corresponding guides in the projecting machine become heated under any condition of actual use.

The heated guides have the same effect upon the film as that of the guides of the projecting machine described above, melting out portions of the cement between the spliced ends of the film sections, and also portions of the emulsion or other foreign matter which may be on the margins of the film. The film is placed in the apparatus with the emulsion side up hence the matter so melted off the film causes it to adhere to the shoe 4, but as soon as it does so the shoe will move in the direction of the feed of the film against the tension of the springs 11 until the pin 9 engages the opposite end of the notch 8, when the movement of the shoe will be stopped and the continued movement of the film will release it therefrom. As the film is fed continuously through the device and not intermittently its adherence to the shoe 4 is not sufficient to cause injury to the film, but is merely enough to cause movement of the shoe 4 against the tension of its spring. Immediately the film is released the springs 11 throw the shoe back to its position shown in the drawing, but the accumulation on the shoe will cause it to immediately adhere again to the film and move again to the left as described. As the film is fed with considerable rapidity this repeated reciprocation of the shoe 4 and engagement of the ends of the notches 8 with the pin 9 produces a chattering noise which will call the attention of the operator who then stops the movement of the film feeding device, lifts the shoe off the machine and cleans the accumulation from the guides 6. For this purpose a cleaning pad of the exact width of the guides may be conveniently used the same being attached to the table adjacent the housing so that the operator can run the shoe 4 over the face of the pad to wipe the accumulation therefrom. After the shoe 4 is cleaned it can be placed back on the housing and the device operated as before.

I have found that when a film is treated in the manner described it may be used repeatedly in the projection machine without any more of the cement or emulsion being melted therefrom for the reason that the guides 3 and 6 are heated well above the temperature of the corresponding parts of the machine and consequently melt off all matter which is fusible at any lower temperature. This can be safely done as the faces of the housing 1 and the shoe 4 opposite the picture portion of the film are entirely covered by asbestos.

It will of course be understood that in place of an incandescent light I may use other suitable means for heating the housing 1. It would be obvious also that in place of depending upon the chattering of the shoe 4 to call the attention of the operator to the accumulation of cement on the shoe, I may arrange any other suitable signal device.

Having thus described my invention, what I claim and desire to secure by Letters Patent is:—

1. The method of treating films which consists in subjecting their marginal portions to a heat sufficient to melt from the film all matter fusible at a temperature to which the film is subjected in a projection machine.

2. The method of treating films, which consists in subjecting their marginal portions to a temperature greater than that to which they are subjected in the projection machine.

3. The method of treating films which consists in subjecting their marginal portions to a heat and pressure sufficient to melt from the film all matter fusible at a temperature to which the film is subjected in a projection machine.

4. The method of treating films which consists in providing heated guides for engaging the margins of films with a predetermined pressure and feeding the film continuously therethrough.

5. The method of treating picture film strips having pictures of less width than the film, which consists in subjecting their marginal portions to a heat sufficient to melt from such portions all matter fusible at a temperature to which a film is subjected in a projection machine while maintaining the picture bearing portion of the strip at a lower temperature.

6. The method of treating films of the character described which consists in subjecting their marginal portions to direct engagement with a pressing member heated to a temperature sufficient to melt from the marginal portions of the film all matter fusible at a temperature to which the film is subjected in a projection machine while maintaining the picture bearing portion of the film out of engagement with such member.

In witness whereof I have hereunto set my hand at the city, county and State of New York, this 18th day of November, 1912.

NICHOLAS POWER.

Witnesses:
W. B. MORTON,
L. E. JOHNSTON.